No. 783,403. PATENTED FEB. 21, 1905.
G. KNIGHT.
MACHINE FOR CUTTING STOCK FOR THE ORNAMENTATION THEREOF.
APPLICATION FILED APR. 26, 1904.
4 SHEETS—SHEET 1.
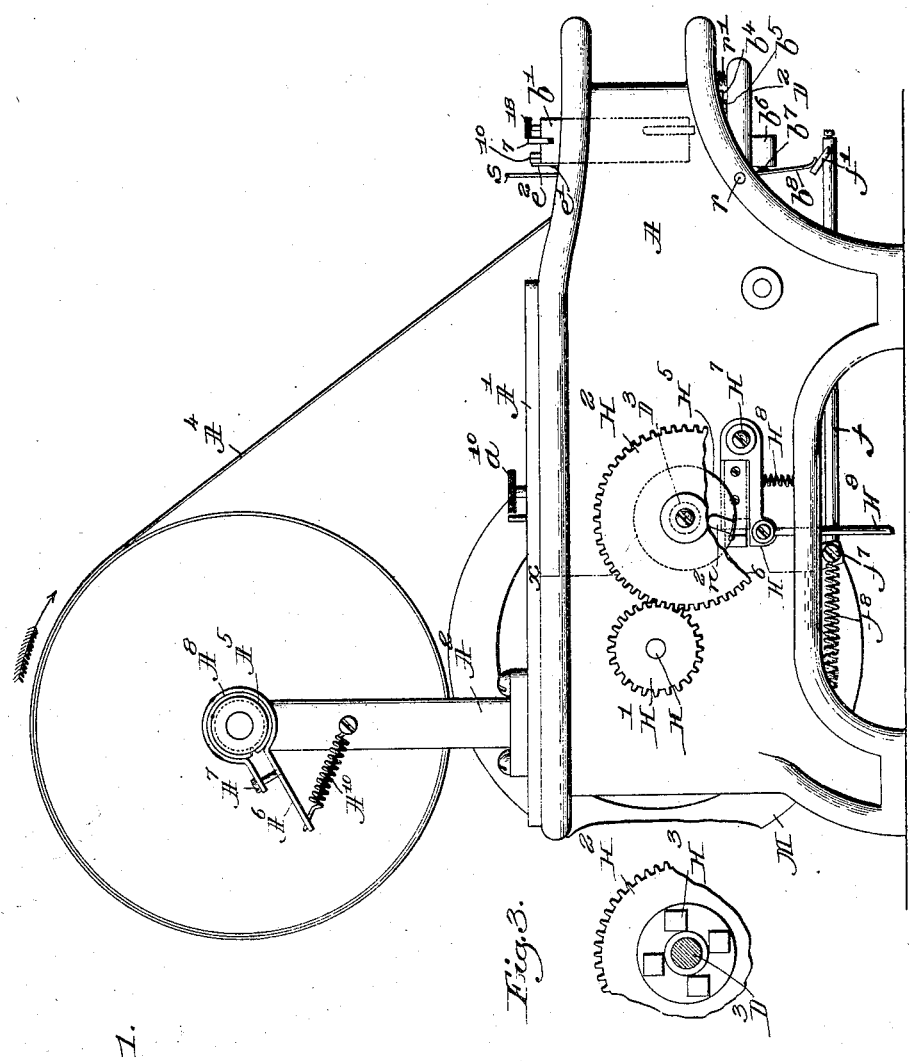
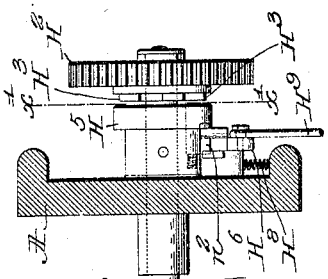
Witnesses:
Fred S. Greenleaf
W. C. Lunsford
Inventor.
George Knight,
by Crosby Gregory
attys.

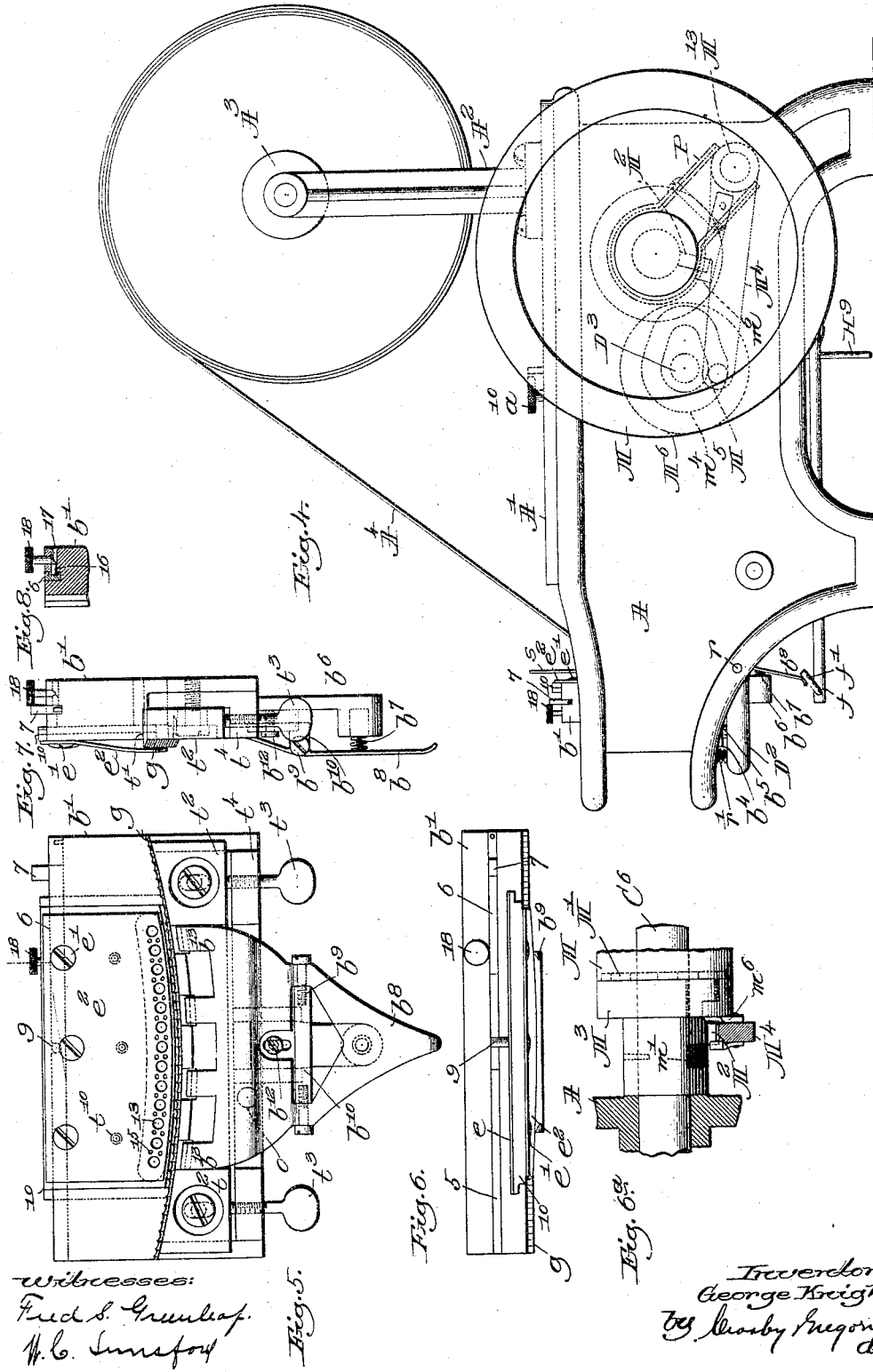

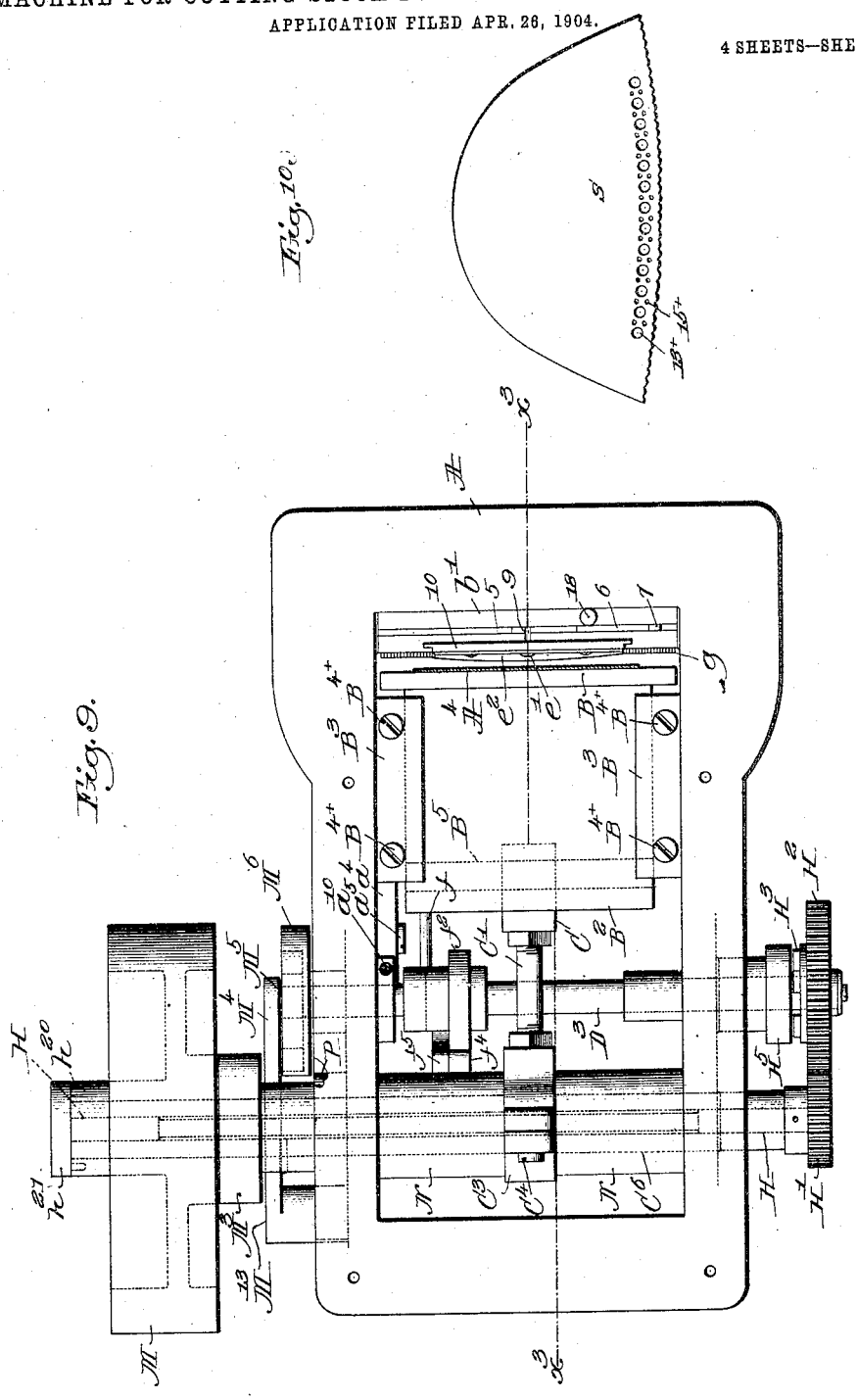

No. 783,403. PATENTED FEB. 21, 1905.
G. KNIGHT.
MACHINE FOR CUTTING STOCK FOR THE ORNAMENTATION THEREOF.
APPLICATION FILED APR. 26, 1904.
4 SHEETS—SHEET 4.
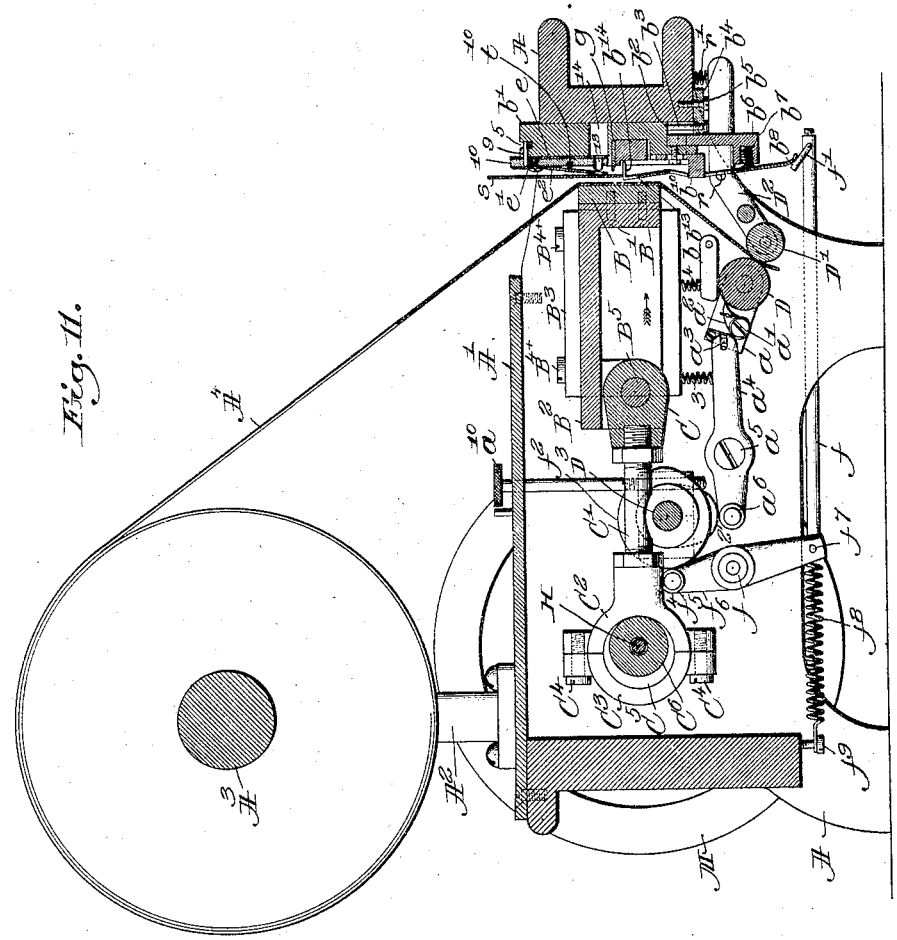
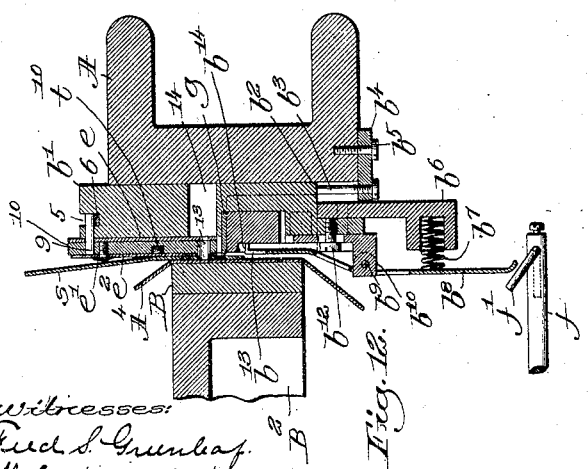

No. 783,403.

Patented February 21, 1905.

UNITED STATES PATENT OFFICE.

GEORGE KNIGHT, OF BROCKTON, MASSACHUSETTS.

MACHINE FOR CUTTING STOCK FOR THE ORNAMENTATION THEREOF.

SPECIFICATION forming part of Letters Patent No. 783,403, dated February 21, 1905.

Application filed April 26, 1904. Serial No. 205,019.

*To all whom it may concern:*

Be it known that I, GEORGE KNIGHT, a citizen of the United States, residing at Brockton, in the county of Plymouth and State of Massachusetts, have invented an Improvement in Machines for Cutting Stock for the Ornamentation Thereof, of which the following description, in connection with the accompanying drawings, is a specification, like characters on the drawings representing like parts.

This invention has for its object the production of a novel machine for cutting stock for the ornamentation thereof.

In accordance with my invention the stock to be ornamented either by punching therethrough holes at any point or scalloping or pinking the edge in desired form is applied to the machine, and the punches and pinking-cutters employed for ornamenting the stock after passing through the stock contact with a non-fibrous background or backing-strip, shown as comprising a strip of paper led from a suitable roll, the machine having means whereby the strip is moved intermittingly, so that at each operation of the punches or pinking-cutter a fresh portion of the strip may be brought into position for use. The stock to be shaped for ornamental purposes is sustained by its edge standing on a movable gage, and the side of the stock is laid next a stripper having openings through which the hollow punches are made to pass in entering the stock. As herein shown, the strip is acted upon at proper times by a movable carriage or plunger that forces the strip against the stock, forcing the latter against the stripper, the hollow punches thereafter entering the stock and contacting with the strip, the cutting edges of the hollow punches punching holes through the stock. The stripper is connected with or forms part of a punch-plate adjustably sustained on a punch-plate holder that may be readily withdrawn from the frame of the machine. The gage for sustaining the edge of the stock is made movable with the carriage.

Figure 1 is a right-hand side elevation of a machine embodying my invention. Fig. 2 is a section below the line $x$, Fig. 1. Fig. 3 is a section looking to the right from the line $x'$, Fig. 2. Fig. 4 is a right-hand side elevation of the machine shown in Fig. 1. Fig. 5 shows the plate-holder and its attached parts removed from the machine; Fig. 6, a top or plan view of the parts shown in Fig. 5. Fig. $6^a$ is a detail showing part of the hub of pulley M and the collar carrying the dog and part of lever $M^4$. Fig. 7 is a right-hand end elevation of the parts shown in Fig. 5. Fig. 8 is a detail to be referred to. Fig. 9 is a plan view of the machine shown in Fig. 1. Fig. 10 shows a piece of stock ornamented as it may be by the use of the machine herein illustrated. Fig. 11 is a section on the line $x^3$, Fig. 9; and Fig. 12 is an enlarged detail showing the stock as being forced onto the punches, the latter contacting with the background.

Referring to the drawings, A represents the framework of the machine, it being of suitable shape to sustain the working parts to be described. The upper edge of the framework sustains a cover-plate A', on which is erected standards $A^2$, that receive the journal of a roll $A^3$, on which is wound a strip, preferably of paper, forming what I have herein chosen to designate as a "background" or "backing-strip" $A^4$. The free end of this strip, of whatever material, is led over a cutter-plate B, preferably of hardened steel, connected by screws B' with a carriage $B^2$, the edges of which enter a suitable guideway, one portion of the guideway presenting overlapping gibs $B^3$, held by screws $B^{4\times}$. The carriage $B^2$ has a stud $B^5$, that is embraced by the head C of an eccentric-strap comprising, in connection with said head, a rod C' and strap parts $C^2 C^3$. The strap parts are clamped by suitable screws $C^4$ on an eccentric $C^5$, secured to a hollow shaft $C^6$, to be described, said shaft in its rotations reciprocating the carriage. The free end of the strip after having been drawn across the cutter-plate is entered between suitable feed-rolls D D'. The roll D' is what may be considered the "sustaining-roll" of the pair of feed-rolls, its journal being free to turn in suitable arms $D^2$, pivoted at $r$ and acted upon by springs $r'$, so that the roll D' may be held firmly but with a yielding pressure against the roller D or the strip therebetween. Both these rolls may be scored or fluted in the direction of their length, as represented by the roll D. The roll D has its journals in suitable bearings of the framework, and the journal is surrounded at one end by a pawl-carrier $a$, having a screw-stud $a'$, upon which is mounted a spring-controlled pawl $a^2$, said spring causing said pawl to be borne always toward the teeth of the roller D. The pawl-carrier has a pin $a^3$, that is embraced by the forked end of a feed-lever $a^4$, pivoted at $a^5$ and having, as shown, at its opposite end a roller or other stud $a^6$, that is acted upon by a cam 2 (see Figs. 9 and 11) at each rotation of the shaft $D^3$. The roller $a^6$ is kept normally pressed toward its actuating-cam 2 by a spring 3, and to prevent any backward movement of the feed-rollers I have employed a detent $b$, which is acted upon by a spring 4.

The shaft or journal of the roller $A^3$ has fast on one end a hub $A^5$, that is embraced by a friction-strap $A^6$, preferably of steel or other metal, that is clamped about the hub by means of a clamp-screw $A^7$. Preferably I interpose between the strap and the hub a piece of leather or other friction material $A^8$. The strap $A^6$ has connected with one end a spring $A^{10}$, that yields as the roller containing the background is turned in the direction Fig. 1, said spring, acting through the strap and tension means comprising the hub, taking up and preventing the formation of slack in the background.

The feed-stroke of the lever $a^4$ must be varied to economize the paper of the background, as it will be understood that the formation of some patterns by the punches will injure more or less of the background, and therefore to vary the feed-stroke to the work to be done I have provided a feed-adjusting rod $a^{10}$, (see Fig. 11,) that may be rotated to place its lower end in such relation to the short arm of the lever $a^4$ as to stop the same on its approach to the cam 2, so that more or less of the throw of the cam may be made effective in turning the lever and feeding the background.

The framework at its front end is provided with a space for the reception of a movable plate-holder $b'$. (Shown in section in Figs. 11 and 12 and detached in Figs. 5 to 7.) The shape of the plate-holder in cross-section is best represented in Figs. 11 and 12. The holder has a shoulder $b^2$ near its lower end that is sustained by adjustable stops $b^3$, shown as screws extended through a plate $b^4$, represented as connected with the framework by screws $b^5$. Depending below the shoulder $b^2$ the holder $b'$ has an ear from the under side of which depends an arm $b^6$, shown as having a pocket for the reception of a spring $b^7$, which acts against the lower arm $b^8$ of a gage pivoted at $b^9$ to a stand $b^{10}$, adjustably connected by a screw $b^{12}$ with the depending portion of the bed, the upper end of said gage having a series of arms $b^{13}$, which are turned over to constitute a series of supports $b^{14}$ to receive and sustain the lower edge of the stock $s$ to be ornamented, said stock being supposed, as represented in Fig. 10, to be of a shape for use as a toe-cap. It will, however, be understood that the invention herein to be described is not to be limited for punching and ornamenting leather only, as instead of leather it may be used to punch and ornament any other stock, and the stock may be used in any part of a shoe or for any other purpose where stock having holes punched therein or punched and scalloped is desired. Fig. 11 shows the supports of the gage in position to sustain the stock, and Fig. 12 shows the same as moved from under the stock.

The upper edge of the holder $b'$ is provided with a groove 5, (see Figs. 9, 11 and 12,) that receives a wedge-shaped slide-bar 6, (see dotted lines,) having a projection 7 at one end. The wedged-shaped slide-bar sustains a pin 9, extended backwardly from a punch-plate 10, and by moving said slide-bar longitudinally the punch-plate may be positioned vertically on the holder with relation to the supports $b^{14}$ of the gage, so that the holes may be punched at the desired distance from the lower edge of the stock. The punch-plate has (see Fig. 5) a series of hollow punches 13, (see Figs. 11 and 12,) having sharp edges, and the punching passing through said punches are discharged into the space 14, from which they drop to the floor. The punch-plate may and preferably will have other or auxiliary punches represented by 15 in Fig. 5, the combination of these punches and variations in their shape enabling the ornamentation of the stock to be varied—as, for instance, the punches 13 may punch holes $13^\times$ and punches 15 holes $15^\times$, and there may be more or less of these holes according to the number of punches, and by putting the punches in different relation one to the other the character of the ornamentation may be variously changed. I have provided means for locking the slide-bar in any adjusted position, the means being a pin 16, located in a hole 17 of the holder, said pin having a tapered end which is acted upon by the tapered end of an adjusting-screw 18, the turning of the adjusting-screw 18 to enter the hole 17 causing the pin to be moved longitudinally and lock the slide-bar in its desired position. The inner ends of the hollow punches are made to enter holes in the punch-plate 10, the rear ends of said punches abutting part of a steel plate $e$, applied to the back of said punch-plate. To the front or left-hand face of the punch-plate I have connected by screws $e'$ a stripper-plate $e^2$, it having a series of holes to surround the punches during the punching operation. This stripper-plate shields the punches when the stock is being inserted to be ornamented and also strips the punched stock off from the punches when the stripper-plate is allowed to assume its normal position after the punches have entered the stock. I have shown a series of spiral springs $t^{10}$ interposed between the punch-plate and stripper, said springs aiding in moving the stripper.

Fig. 11 shows the carriage and the rest B in their retracted position and with the stock resting on the supports $b^{14}$. Now as the carriage is moved to the right in the direction of the arrow thereon, Fig. 11, the background of paper is moved forwardly and pushed against the rear side of the stock $s$, causing the stock to be forced against the stripper-plate, the stripper-plate yielding so that its holes pass over the punches for a distance sufficient to permit the ends of the punches against which the stock is forced to penetrate the stock and contact with the background. After each operation of this kind the feed-rolls will be moved to bring opposite the punches a portion of the background other than that which received the impact of the stock where the same was acted upon by the punches. As the carriage and rest are retracted the stripper is moved outwardly into the position Fig. 11 and strips the stock from the punches, and this done a gage-mover $f$, shown as a rod having an adjustable finger $f'$, is moved forwardly from the position Fig. 11 by the action of a cam $f^2$, carried by shaft $D^3$ on a roller or other stud $f^4$ of a lever $f^5$, pivoted at $f^6$, said lever being connected at its lower end with said rod by a stud-screw $f^7$. A spring $f^8$, connected with said lever and with a stud $f^9$ of the frame, normally moves the rod $f$ backwardly or to the left viewing Fig. 11. As the rod $f$ is moved to the right the finger $f'$ meets the lower end $b^8$ of the gage and turns the latter so that any waste of stock may drop out of the machine. This waste is in the form of a strip and is formed of the material cut off from the lower end of the stock by a pinking-cutter $g$, shown as a blade having a cutting edge, which may, if desired, be scalloped or be made of any desired shape customarily used in scalloping or so-called "pinking." Figs. 11 and 12 show said blade in section, and it is represented as clamped in working position between shoulders $t'$ of the punch-plate holder, and a movable-jaw $t^2$, held in its operative position by suitable screws $t^3$ inserted in threaded holes in a flange $t^4$ of said holder.

The shaft $C^6$, represented as hollow, turns in two inwardly-extended hubs N, and through this shaft is extended a drive-shaft H, on which is fastened a pinion $H'$, that engages a gear $H^2$, loose on the shaft $D^3$, said gear having a series of teeth $H^3$, that are engaged when it is desired to start the shaft $D^3$ and rotate the same once by a slide-tooth $n^2$, contained in a hub $H^5$ and adapted to be projected therefrom to be engaged by the teeth of said gear whenever a spring-pressed lever $H^6$, pivoted at $H^7$ and normally kept elevated by a spring $H^8$ and adapted to be lowered through a rod $H^9$, connected by a treadle, is depressed against the spring $H^8$. The shaft H has keyed upon it a fast pulley M, having a series of teeth $M'$, (see Fig. 6ª,) that may be engaged by a sliding dog or key $M^2$, carried by a collar $M^3$, secured to the hollow shaft $C^6$, said dog being acted upon by a spring $m'$, this dog $M^2$ when projected from the hub by its spring being engaged by one or the other of the series of teeth $M'$ at the inner side of the hub of the pulley M. The pulley is rotated continuously and rotates the shaft H, fixed with relation thereto by studs $h^{20}$ in the head $h^{21}$ entering holes in the hub of the pulley, thus keying the pulley to said shaft; but the hollow shaft $C^6$ and the shaft $D^3$ are rotated intermittingly and at different speeds. Each shaft $C^6$ and $D^3$ rotates once and stops. When the lever $H^6$ is depressed, the continuously-moving gear $H^2$ becomes engaged with and starts the shaft $D^3$ in advance of the hollow shaft $C^6$, and having made a quarter-turn the cam-groove $m^4$ of the disk $M^6$, acting on a stud of a lever $M^4$, pivoted at one end on a stud $M^{13}$, held in the frame, is moved to withdraw an arm $m^6$ of said lever from a notch in the dog $M^2$, thus releasing said dog that the latter may come into engagement with the rotating pulley M and start the hollow shaft at a faster speed, so that said hollow shaft completes a revolution by the time the shaft $D^3$ has completed three-quarters of a revolution. During the last quarter-revolution of the shaft $D^3$ the feed-rolls are turned to move the background, and just before the rotation of shaft $D^3$ is stopped the rod $f$ is moved to turn the gage into position to receive the next piece of work to be put into place to be acted upon.

Figs. 11 and 12 show the spring $b^7$ in the position it will occupy when the pinking-cutter is employed; but in case the pinking-cutter is omitted then I may remove the spring $b^7$ and put the same into a hole $o$, (shown by dotted lines in Figs 5 and 12,) said spring in such position acting normally to keep the upper end of the gage pressed against the background or the rest sustaining it, the employment of the spring $b^7$ in the position shown in Fig. 12 and the projection $f'$ to push the lower end of the gage in opposition to said spring being required only when the pinking-cutter is used, it being understood that the cuttings removed by the pinking-cutter must pass between the upper end of the gage $b^8$ and the background in the space shown in Fig. 12.

The background prevents the rapid dulling of the cutters coacting with the cutter-plate B and also enables the punches and blade to make a cleaner cut than though the punches and blade contacted directly with the cutter-plate after passing through the stock.

It will be noted that the stock to be punched is supported by its edge on the gage instead of being laid on a horizontal bed, as usual.

The smaller part of the hub $M^3$ may be surrounded by a brake-band P (see Figs. 4 and 9) to stop the rotation of shaft $C^6$ when released from the pulley M.

Having described my invention, what I claim, and desire to secure by Letters Patent, is—

1. In a machine of the class described, a detachable holder having a connected gage, a punch-plate removably supported by said holder and having a plurality of punches, a pinking-cutter also removably supported by said holder, and means to cause the punches to penetrate the stock, the removability of the punch-plate and pinking-cutter permitting any one of a series of different plates and cutters to be used, according to the design desired for a shoe-tip.

2. In a machine of the class described, a punch-plate having a series of punches, a stripper yieldingly supported by said punch-plate and an independent yielding gage located below the edge of the punch-plate and stripper to support the edge of the stock to be punched, a cutting-plate, and actuating means to cause the punches to penetrate the stock.

3. In a machine of the class described, a plate-holder, a connected punch-plate having a series of hollow punches, a yielding laterally-movable gage sustained by said holder for the edge of the work being punched, and means to adjust the relative positions of the punch-plate and gage to determine the distance of the row of holes from the edge of the material.

4. In a machine of the class described, a gage, a plate-holder, a punch-plate having a series of hollow punches, a detachable pinking-cutter, and means to adjust the position of the punch-plate with relation to said gage and pinking-cutter.

5. In a machine of the class described, a punch-plate having a series of holes for the reception of hollow punches, a plate coacting therewith having a series of smaller holes and located with relation to the punch-plate to sustain the inner ends of said hollow punches.

6. In a machine of the class described, a series of hollow punches, means to sustain a backing-strip, means independent of said punches to feed said strip, and means to cause the punches to penetrate the stock backed up by said strip.

7. In a machine of the class described, a series of hollow punches, a rest to sustain a backing-strip, means independent of the punches to feed said backing-strip, and means to change the relative positions of said rest and punches, that the latter may penetrate the stock resting against said backing-strip.

8. In a machine of the class described, a series of hollow punches, a cutter-plate to sustain a backing-strip, and means to change the relative positions of said plate and punches, that the latter may penetrate the stock resting against said backing-strip, and means independent of the punches to feed the strip after each punching operation.

9. In a machine of the class described, a series of hollow punches, a stripper-plate, means independent of said punches to feed a backing-strip and cause the same to contact intermittingly with one side of the stock and cause the opposite side thereof to act against the stripper-plate, the punches thereafter entering the stock opposite where the stock contacts with said strip.

10. In a machine of the class described, a series of hollow punches, a gage to position the stock, means independent of said punches to feed a backing-strip, the latter supporting one side of the stock while the punches enter the opposite side of the stock.

11. In a machine of the class described, a series of hollow punches, a gage to position the stock, means to sustain a backing-strip, the latter supporting one side of the stock while the punches enter the opposite side of the stock, and means independent of the punches to feed said strip.

12. A carriage having a cutter-plate, a punch-plate having a series of hollow punches, a backing-strip crossing said plate, means to feed said strip intermittingly over said plate while the punches occupy their inoperative positions, and means to change the relative positions of said carriage and punches that the latter may cut through the stock into the backing-strip, thereby insuring a clean cut of the stock.

13. In a machine of the class described, a punch-plate having a series of detachable hollow punches, and a stripper-plate having one edge fixed near one edge of said plate, the opposite edge of the stripper standing normally at a short distance beyond the outer ends of said punches, yielding under the action of forcing the stock against said stripper-plate while the punches penetrate the stock.

14. In a machine of the class described, a gage to sustain the edge of the stock to be pinked, a pinking-cutter, and means to move said gage automatically after each operation of the pinking-cutter to effect the discharge of the cutting.

In testimony whereof I have signed my name to this specification in the presence of two subscribing witnesses.

GEORGE KNIGHT.

Witnesses:
GEO. W. GREGORY,
EDITH M. STODDARD.